(12) United States Patent
Iida

(10) Patent No.: US 9,007,519 B2
(45) Date of Patent: Apr. 14, 2015

(54) IMAGING DEVICE FOR MEASUREMENT PROCESSING

(75) Inventor: Hiroyuki Iida, Yao (JP)

(73) Assignee: OMRON Corporation, Kyoto-shi (JP)

( * ) Notice: Subject to any disclaimer, the term of this patent is extended or adjusted under 35 U.S.C. 154(b) by 946 days.

(21) Appl. No.: 13/029,517

(22) Filed: Feb. 17, 2011

(65) Prior Publication Data

US 2011/0221951 A1    Sep. 15, 2011

(30) Foreign Application Priority Data

Mar. 12, 2010   (JP) .................. 2010-055872

(51) Int. Cl.
  *H04N 5/225*   (2006.01)
  *H04N 5/232*   (2006.01)
  *G02B 7/04*    (2006.01)

(52) U.S. Cl.
  CPC ........................................ *G02B 7/04* (2013.01)

(58) Field of Classification Search
  None
  See application file for complete search history.

(56) References Cited

U.S. PATENT DOCUMENTS

| | | | | |
|---|---|---|---|---|
| 5,792,987 A * | 8/1998 | Dong et al. | ................. | 174/74 A |
| 6,108,129 A | 8/2000 | Van Slyke | | |
| 6,822,810 B2 * | 11/2004 | Ichino | ............................ | 359/696 |
| 7,898,745 B2 * | 3/2011 | Matsui et al. | ................. | 359/694 |
| 8,339,504 B2 * | 12/2012 | Uehara et al. | ................. | 348/345 |
| 2002/0106205 A1 | 8/2002 | Kikuchi et al. | | |
| 2004/0165280 A1 | 8/2004 | Ichino | | |
| 2007/0177052 A1 * | 8/2007 | Yamamoto | ................... | 348/375 |

FOREIGN PATENT DOCUMENTS

| | | |
|---|---|---|
| JP | 09-096754 A | 4/1997 |
| JP | 2001-256430 A | 9/2001 |
| JP | 2002-176580 A | 6/2002 |
| JP | 2003-185924   * | 7/2003 |
| JP | 2003-185924 A | 7/2003 |

OTHER PUBLICATIONS

Japanese Office Action dated Jul. 24, 2012 (machine language English translation).

* cited by examiner

*Primary Examiner* — Luong T Nguyen
(74) *Attorney, Agent, or Firm* — Marvin A. Motsenbocker; Mots Law, PLLC

(57) ABSTRACT

An aspect of the invention provides an imaging device for measurement processing, which comprises: an imaging unit that forms an image; a lens positioned to guide incident light to the imaging unit; and an adjustment mechanism that adjusts the distance between the lens and the imaging unit by moving the lens along the optical axis of the lens, the optical axis extending in a first direction, the adjustment mechanism comprising: a first threaded member having a longitudinal axis extending in a second direction that is different from the first direction, wherein the first threaded member is rotatable around longitudinal axis thereof without moving in the second direction; and a conversion mechanism that converts a rotation of the first threaded member around longitudinal axis thereof into a movement of the lens along the optical axis of the lens.

13 Claims, 14 Drawing Sheets

FIG. 10                                PRIOR ART
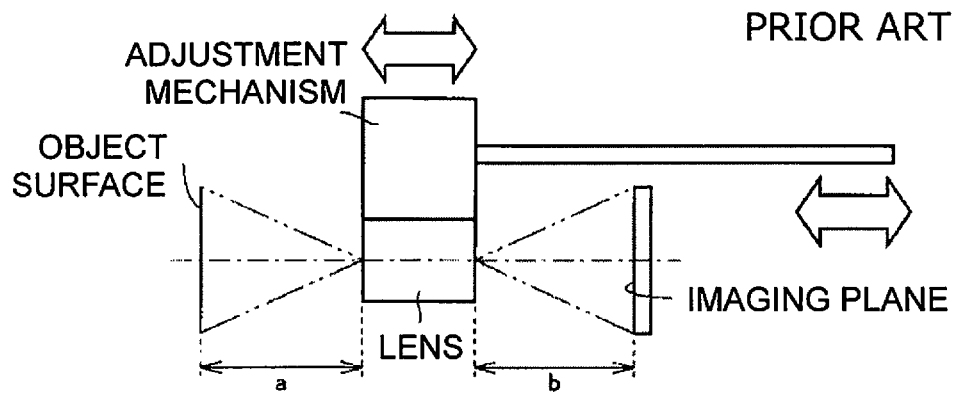
FIG. 11                                PRIOR ART
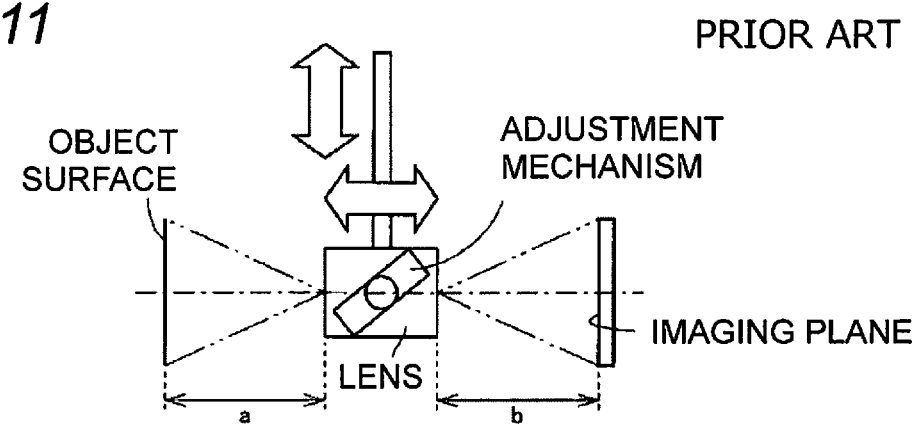
FIG. 12         PRIOR ART
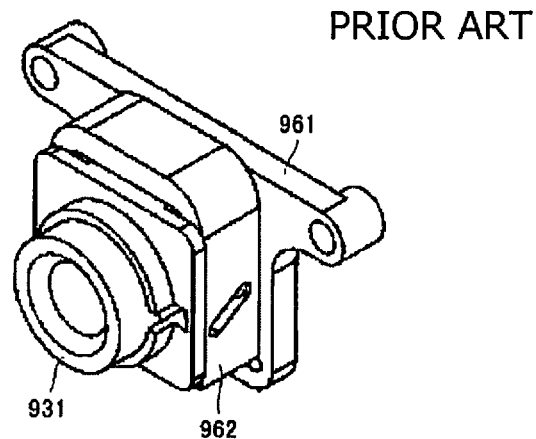

PRIOR ART

PRIOR ART

PRIOR ART

PRIOR ART

IMAGING DEVICE FOR MEASUREMENT PROCESSING

CROSS REFERENCE TO RELATED APPLICATIONS

This application claims priority based on 35 USC 119 from prior Japanese Patent Application No. 2010-055872 filed on Mar. 12, 2010, entitled "IMAGING DEVICE FOR MEASUREMENT PROCESSING", the entire contents of which are incorporated herein by reference.

BACKGROUND OF THE INVENTION

1. Technical Field

The present invention relates to imaging devices for measurement processing, and in particular, to an imaging device for measurement processing, which outputs a signal representing an image to perform an attribute measurement process defined in advance with respect to the imaged image.

2. Related Art

In the field of FA (Factory Automation) or the like, various types of image processing techniques have been used. In such image processing techniques, a visual sensor outputs a signal indicating an image to perform a measurement process on the shape, pattern, or color of a product to be manufactured, or a combination of the above (see Patent Document 1).

Indicators for the performance of such a visual sensor include installation distance (workpiece distance), (hereinafter also referred to as "WD", "imaging target distance") and detection range (hereinafter also referred to as "field", "imaging range"). The installation distance is the distance between the visual sensor and the measuring target. The detection range is the range that can be imaged at the installation distance.

Users have various requirements concerning the combination of the WD and the field of the visual sensor. A great number of variations (product groups) are preferably lined up for the visual sensor to respond to such requests.

To this end, visual sensors provided with a lens having various combinations of WD and field may be lined up, or visual sensors in which the same lens is used but a back focus (hereinafter also referred to as "BF") that is the distance from the lens to an imaging plane (e.g., of the imaging element) is varied may be lined up.

The value a of the WD and the value b of the BF are related by $1/a + 1/b = 1/f$, where f is the focal distance of the lens according to the formula of the lens. Thus, various WD can be accommodated by varying the BF.

There are visual sensors in which the BF is fixed at the time of manufacturing and visual sensors in which the BF is adjustable by the user. In visual sensors in which the BF can be adjusted, a force cannot be directly applied to the lens along the axis on which the lens moves since the light from an object surface, which is the surface of the imaging target, enters the lens or the light enters the imaging plane of the imaging element from the lens along the axis on which the lens moves.

FIG. 10 is a first view illustrating an adjustment method of the back focus in a visual sensor. With reference to FIG. 10, in an adjustment method A, the force for moving the lens along an axis parallel to the axis of the lens movement is transmitted as a force for moving the lens along the axis on which the lens moves by an adjustment mechanism.

The force for moving the lens along the axis on which the lens moves thus can be indirectly applied on the lens. At the same time, however, the lens may not smoothly move on the axis since a moment about the axis orthogonal to the axis of the lens movement is exerted on the lens.

FIG. 11 is a second view illustrating an adjustment method of the back focus in a visual sensor. With reference to FIG. 11, in the adjustment method B, the force applied along a direction not parallel to the axis on which the lens moves (e.g., orthogonal direction) is transmitted as a force for moving the lens along the axis on which the lens moves by an adjustment mechanism.

According to the method B, the force for moving the lens along the axis on which the lens moves can be indirectly applied to the lens without exerting the moment that is exerted on the lens in the method A. Thus, the lens can be smoothly moved on the axis compared to the method A.

RELATED DOCUMENTS

Patent Documents

[Patent Document 1] Japanese Published Patent Application No. 2001-256430

FIGS. 12 to 16 are first to fifth diagrams illustrating specific examples of an adjustment method of the back focus in the visual sensor. With reference to FIGS. 12 to 16, the visual sensor at least includes a lens barrel 931, a lens guide 961, a lens slider 962, a spring 965, a screw 963, an O-ring 964, and a housing 901.

The lens barrel 931 includes a lens inside a barrel, which guides incident light from one end to an imaging element on the other end. The lens guide 961 is fixed to the housing 901, and movably guides the lens barrel 931 along the direction of the optical axis of the lens. The direction of the optical axis of the lens is referred to as the longitudinal (front-back) direction, the side on which the light enters in the lens barrel 931 is referred to as the front and the imaging element side is referred to as the back.

The screw 963 is screwed to a female thread cut in the housing 901. The axial direction of the screw 963 is referred to as the vertical (up-down) direction, the head side of the screw 963 is referred to as up and the distal end side as down. The screw 963 contacts the lens slider 962 at the distal end, and exerts force downwardly on the lens slider 962. The lens slider 962 moves the lens barrel 931 along the longitudinal direction according to the change in position of the lens slider when moved in the vertical direction.

The spring 965 is sandwiched between the lens guide 961 and the lens slider 962 so as to exert force in the vertical direction with respect to each other. The lens slider 962 is subjected to a force in the upward direction by the spring 965 since the lens guide 961 is fixed to the housing 901. That is, the lens slider 962 is sandwiched by the screw 963 and the spring 965, and fixed at a position in the vertical direction defined by the screw 963.

The O-ring 964 seals the space between the housing 901 and the head of the screw 963 so that water or the like does not enter from the female thread to which the screw 963 of the housing 901 is screwed.

The lens slider 962 includes an inclined groove serving as an engagement section extending in a diagonal direction different from the longitudinal direction and the vertical direction, in a slide plane including the longitudinal direction and the vertical direction. The lens barrel 931 includes an engagement projection to be engaged with the inclined groove of the lens slider 962.

When the screw 963 is rotated by the user, the screw moves in the vertical direction with respect to the housing 901. The lens slider 962 is then moved along the vertical direction, so that force is exerted in the diagonal direction on the engagement projection of the lens barrel 931 to be engaged to the inclined groove. The lens barrel 931 is movable along the longitudinal direction, and thus is moved along the longitudinal direction by the force in the diagonal direction exerted on the engagement projection.

As shown in FIG. 14A, FIG. 15A, and FIG. 16A, the lens slider 962 is positioned at the top in a state where the screw 963 is loosened the most, that is, in a state where the screw 963 is at the top. Thus, the engagement projection of the lens barrel 931 is in a state engaged on the lower front side of the inclined groove of the lens slider 962. Therefore, the lens barrel 931 is in a state projected furthest out towards the front. In this case, the back focus of the lens becomes maximum. As a result, the workpiece distance becomes minimal.

As shown in FIG. 14B, FIG. 15B, and FIG. 16B, the lens slider 962 is positioned at the bottom in a state where the screw 963 is tightened the most, that is, in a state where the screw 963 is at the bottom. Thus, the engagement projection of the lens barrel 931 is in a state engaged on the upper end back side of the inclined groove of the lens slider 962. Therefore, the lens barrel 931 is in a state retracted towards the back the most. In this case, the back focus of the lens becomes minimal. As a result, the workpiece distance becomes maximum.

However, in the case of such a visual sensor, the head of the screw 963 needs to be within the thickness of the housing 901 since the O-ring 964 arranged between the head of the screw 963 and the housing 901 prevents water from entering. Thus, the range covered by the WD and the field becomes narrow if the stroke of the screw 963 is limited by the thickness of the housing 901 and the stroke of the screw 963 is shortened.

If the housing 901 is made thick to have the stroke of the screw 963 longer, the size of the housing 901 becomes large. As a result, the size of the visual sensor becomes large, which goes against the demand to miniaturize the visual sensor.

The length of the female thread in the housing 901 is also limited for the miniaturization of the visual sensor. It is conceivable to make the pitch of the thread large in order to lengthen the stroke of the screw 963 with the limited length of the female thread. However, if the pitch of the thread is made large, it does not fall within the JIS standard. Thus, a need to custom-manufacture of the screw 963 and the cut the female thread in the housing 901 increases. As a result, the cost increases.

Therefore, various problems are caused by expanding the variations of the WD and the field of the visual sensor when a female thread is provided in the housing 901.

Furthermore, since the screw 963 rotates with respect to the lens slider 962 in the visual sensor, the screw 963 and the lens slider 962 cannot be fixed. The movement of the lens slider 962 needs to follow the movement of the screw 963 in the vertical direction. Thus, the spring 965 is necessary.

As a result, the structure becomes complex, and the cost increases due to the increase in the number of assembly steps. Furthermore, when an external force caused by vibration or impact greater than the force for pushing the lens slider 962 against the screw 963 by the spring 965 is applied, a state in which the lens slider cannot be pushed by the spring 965 arises. Thus, the lens slider 962 is subject to play with respect to the housing 901, and hence the WD and the field of the visual sensor fluctuate. As a result, problems arise in the measurement processing by the visual sensor.

SUMMARY

An aspect of the invention provides an imaging device for measurement processing, comprising: an imaging unit that forms an image; a lens positioned to guide incident light to the imaging unit; and an adjustment mechanism that adjusts the distance between the lens and the imaging unit by moving the lens along the optical axis of the lens, the optical axis extending in a first direction, the adjustment mechanism comprising: a first threaded member having a longitudinal axis extending in a second direction that is different from the first direction, wherein the first threaded member is rotatable around longitudinal axis thereof without moving in the second direction; and a conversion mechanism that converts a rotation of the first threaded member around longitudinal axis thereof into a movement of the lens along the optical axis of the lens.

The longitudinal axis of the first threaded member and the optical axis of the lens may be arranged in such a manner that the longitudinal axis of the first threaded member does not intersect with the optical axis of the lens. Furthermore, they may be arranged in such a manner that the longitudinal axis of the first threaded member does not intersect with the lens or an extension thereof in the optical axis direction of the lens.

The imaging device may further include a housing, the imaging element being fixed to the housing. Moreover, the adjustment mechanism may include an adjustment unit including the first threaded member, the adjustment unit being attached to the housing so as to be rotatable in a direction of the first threaded member with respect to the housing so that movement of the first threaded member in the axial direction is restrained.

The adjustment mechanism may further include a slider unit including a second threaded member engaging the first threaded member. Moreover, the conversion mechanism may be adapted to movably guide the slider unit along the second direction and move the lens along the first direction to change the imaging element distance according to a change in position of the slider unit along the second direction due to the rotation of the first threaded member.

The imaging device may be adapted to output a signal that represents an image to perform an attribute measurement process defined in advance with respect to the formed image.

In accordance with one aspect of the invention, in order to achieve the above objective, an imaging device for measurement processing for outputting a signal representing an image to perform an attribute measurement process defined in advance with respect to the formed image is provided; the imaging device for measurement processing including: a housing; an imaging element, fixed to the housing, for forming an image entered to an imaging plane including the imaging plane; a lens unit, including a lens in which the range of the imaging target entering the imaging element changes according to an imaging element distance with the imaging element, for guiding incident light to the imaging element; and an adjustment mechanism for moving the lens unit along a first direction, which is the direction of an optical axis of the lens.

The adjustment mechanism may include an adjustment unit including a first threaded member and being attached to the housing so that then axial direction of the first threaded member is a second direction different from the first direction, and so as to be attached and rotatable in a direction of the first threaded member with respect to the housing and so that movement in the axial direction is restrained; a slider unit including a second threaded member to be screw-fitted with the first threaded member; and a conversion mechanism for movably guiding the slider unit along the second direction and moving the lens unit along the first direction to change the imaging element distance according to change in position of the slider unit along the second direction by the rotation of the adjustment unit.

Preferably, the adjustment mechanism may include a lens holder for supporting the lens, and a lens frame to which the slider unit is attached and which surrounds the lens holder. The conversion mechanism may be arranged between the lens holder and the lens frame.

Further preferably, the conversion mechanism may include an engagement section, which extends in a third direction that is different from the first direction and the second direction and lies in a slide plane including the first direction and the second direction, arranged on one of the lens holder and the lens frame. An engagement projection which engages the engagement section may be arranged on the other one of the lens holder and the lens frame.

Further preferably, the engagement section is arranged on the lens frame and the engagement projection is arranged on the lens holder. The engagement section may include a band-shaped inclined portion extending in the third direction, and the engagement projection may include a pair of projections for sandwiching the band-shaped inclined portion.

Preferably, the imaging device includes a controller that restrains movement between the adjustment unit and the slider unit. Preferably, the angle formed by the first direction and the second direction is substantially a right angle.

Preferably, the imaging element, the lens unit, and the adjustment mechanism are accommodated inside the housing. The adjustment unit may include a head on which a tool is applied to turn the first threaded member about the axial direction. The head may include a tool engagement portion exposed from the housing to be engaged by the tool, a seal being arranged between the head and the housing.

According to one aspect of the invention, the lens unit is moved in the optical axis direction by the slider unit including the second threaded member to be screw-fitted with the first threaded member restrained to the axial direction of the threaded portion of the housing. Thus, the force can be applied to the lens unit so that there is no play with respect to the housing.

The first threaded member is restrained in the axial direction with respect to the housing, and the slider unit including the second threaded member that is screw-fitted with the first threaded member is moved by the first threaded member. Thus, the positional relationship of the housing and the first threaded member is constant, and hence problems do not arise from the relationship of the head of the first threaded member and the housing even if the threaded portion of the first threaded member is made long, whereby a stroke of the slider unit may be made larger and a stroke of the lens may be made larger.

As a result, an imaging device for measurement processing capable of expanding the variation of the imaging target distance and the imaging range without creating problems in the attribute measurement process can be provided.

BRIEF DESCRIPTION OF THE DRAWINGS

FIG. 10 is a first view illustrating an adjustment method of the back focus in a visual sensor;

FIG. 11 is a second view illustrating an adjustment method of the back focus in the visual sensor;

FIG. 12 is a first view illustrating a specific example of an adjustment method of the back focus in the visual sensor;

DETAILED DESCRIPTION

Figure 1:
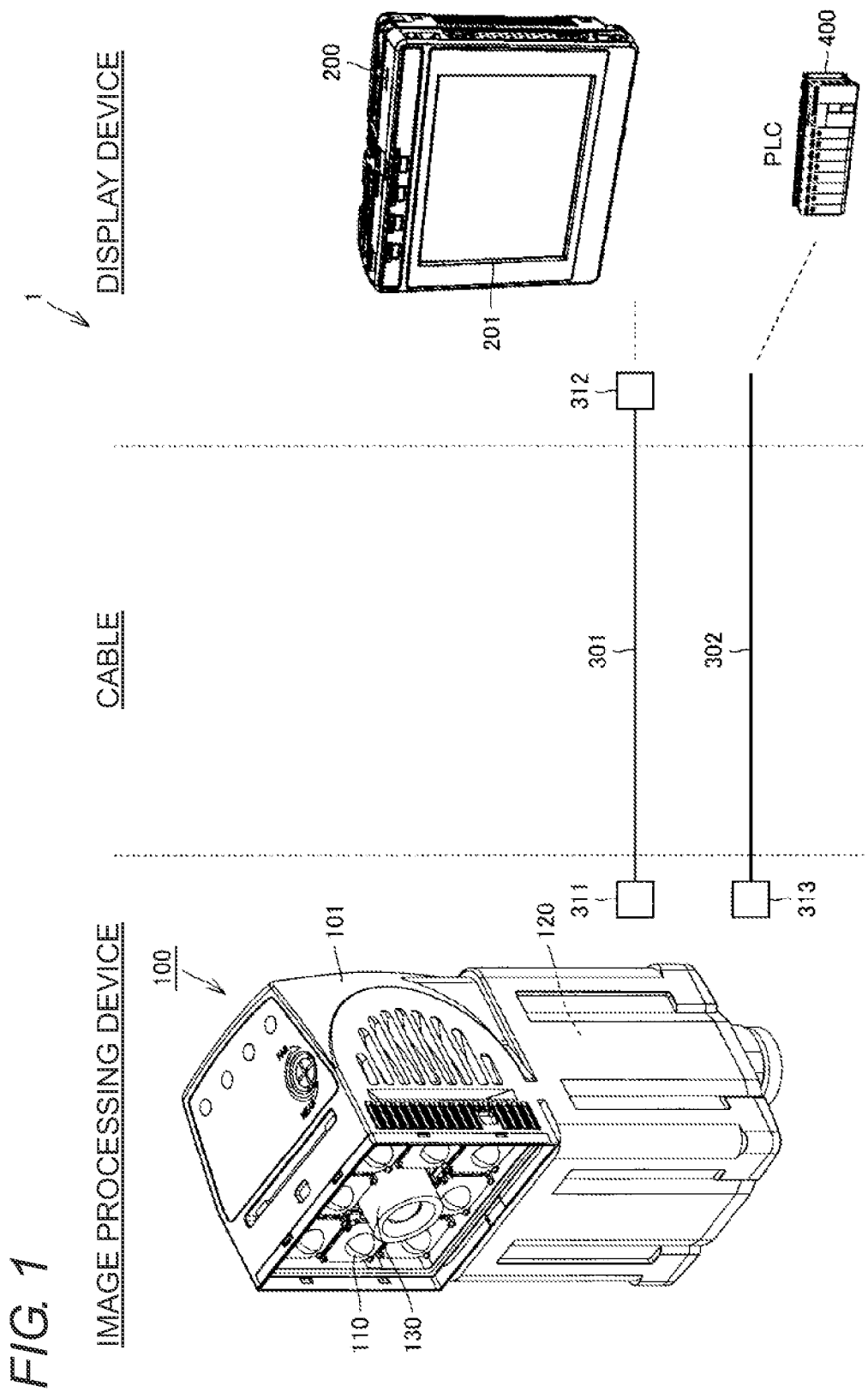
FIG. 1 is a schematic view showing the overall configuration of a visual sensor system including an image processing device according to one embodiment.

Hereinafter, preferred embodiments of the invention will be described with reference to the drawings. The same reference numerals are denoted for the same or corresponding portions in the figures, and the description thereof will not be repeated.

<A. System Configuration>

An image processing device including a controller for processing images will be described as an example of an imaging device for measurement processing. However, there is no limitation to this, and other devices may be adopted as long as they are devices for outputting a signal representing an image for performing an attribute measurement process defined in advance with respect to the formed images. The imaging device for use in measurement processing is not limited to an image processing device including a controller as hereinafter described. The imaging device for measurement processing is also not limited to being used in a visual sensor system, as hereinafter described.

FIG. 1 is a schematic view showing an overall configuration of a visual sensor system 1 including an image processing device 100 according to the embodiment.

With reference to FIG. 1, in the visual sensor system 1 according to the embodiment, the image processing device 100 and a display device 200 can be connected by a LAN (Local Area Network) cable 301. More specifically, one end of the LAN cable 301 can be attached to the image processing device 100 through a connector 311. The other end of the LAN cable 301 can be attached to the display device 200 through a connector 312.

A plurality of image processing devices 100 may be connected to one display device 200 through the LAN cable 301 and a hub (not shown). The user can control the plurality of image processing devices 100 through the display device 200. The display device 200 can display the image processing results from the plurality of image processing devices 100.

The image processing device 100 and a PLC (Programmable Logic Controller) 400 can be connected by an IO cable 302. More specifically, one end of the IO cable 302 can be attached to the image processing device 100 through a connector 313. The other end of the IO cable 302 is connected to the PLC 400. The PLC 400 can control the entire visual sensor system 1 by receiving signals from other devices and transmitting signals to other devices. The image processing device 100 and the PLC 400 may be connected through the LAN cable 301 and the hub (not shown). The power is externally supplied to the image processing device 100 through the IO cable 302.

The visual sensor system 1 is incorporated in a production line, or the like, for example. The visual sensor system 1 executes the process (hereinafter also referred to as "measurement process" or "measurement processing") of recognition of characters or inspection of scratches based on an image obtained by imaging the inspection target ("workpiece 500" in FIG. 2).

By way of example, the workpiece 500 is transported in a predetermined direction by a transporting mechanism such as a belt conveyor (not shown) in the embodiment. The image processing device 100 is arranged at a position fixed with respect to the transport path. The image processing device 100 images the transported workpiece 500 a plurality of times. The data for the plurality of images obtained by the image processing device 100 is transmitted to the display device 200.

In the specification, "imaging" generally refers to a process in which an imaging section 130 of the image processing device 100 receives light from a subject in the field and outputs an image (image signal and image data) representing the same. However, in a case where the imaging section 130 repeatedly generates the image representing the subject in the field at predetermined intervals, "imaging" means the process of storing a specific image out of the images generated by the imaging section 130 in a storage unit. In other words, from a certain standpoint, "imaging" means a process in which the imaging section 130 acquires an image representing the content of the subject in the field and having the same in a state subject to a measurement process at a certain intended timing.

When the workpiece 500 reaches the field of the imaging section 130, it is detected by a detection sensor or the like (not shown) arranged at both ends of the transporting mechanism. A signal (hereinafter also referred to as "trigger signal") from the detection sensor is transmitted to the PLC 400. The PLC 400 causes the image processing device 100 to photograph the workpiece 500 based on the trigger signal.

<B. Configurations of Image Processing Device 100 and Display Device 200>

Figure 2:
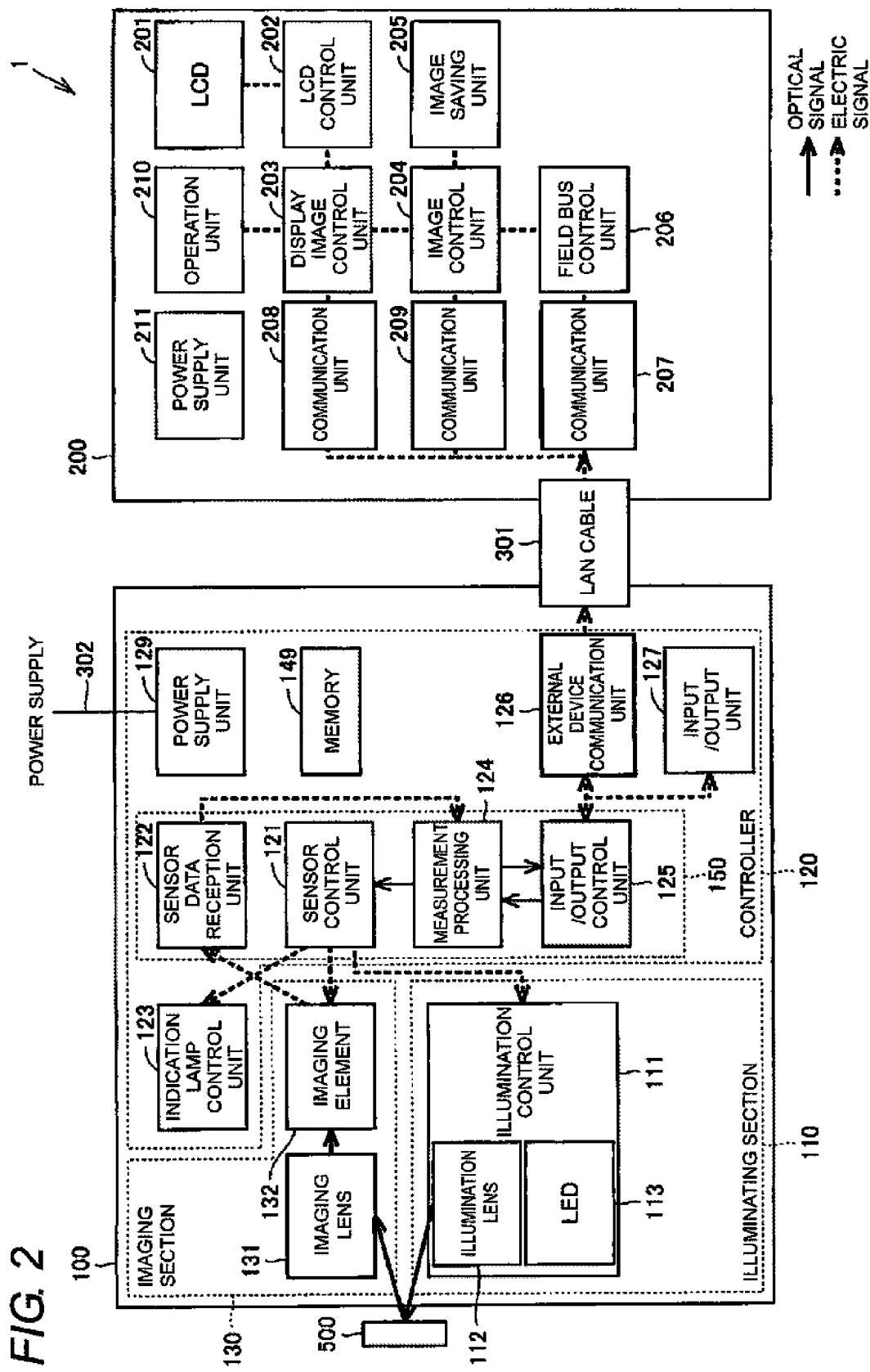
FIG. 2 is a block diagram showing the configurations of the image processing device and a display device.

The configurations of the image processing device 100 and the display device 200 will now be described. FIG. 2 is a block diagram showing the configurations of the image processing device 100 and the display device 200.

The configuration of the image processing device 100 will be described first with reference to FIG. 2. The image processing device 100 includes an illuminating section 110, a controller 120, and the imaging section 130.

The illuminating section 110 irradiates the workpiece 500 with light. In other words, the illuminating section 110 irradiates the imaging range of the imaging section 130 with light. The illuminating section 110 includes a plurality of illumination control units 111 arranged on an illumination substrate, to be described later. In the embodiment, eight illumination control units 111 are arranged on the illumination substrate. Each of the illumination control units 111 includes an illumination lens 112 and an LED 113. For instance, the illumination control unit 111 emits light based on a command from the controller 120.

The controller 120 is provided to control the image processing device 100. In other words, the controller 120 controls the illuminating section 110 and the imaging section 130. The controller 120 performs the image processing based on the image signal from the imaging section 130. The controller 120 exchanges data with devices external to the image processing device 100. For instance, the controller 120 receives commands from the PLC 400 or transmits the image processed image data (still image data, moving image data, or the like) to the display device 200 through the LAN cable 301.

More specifically, the controller 120 includes a sensor control unit 121, a sensor data reception unit 122, a indication light control unit 123, a measurement processing unit 124, an input/output control unit 125, an external device communication unit 126, an input/output unit 127, and a power supply unit 129.

The sensor control unit 121 sends a command to the plurality of illumination control units 111 of the illuminating section 110, an imaging element 132 of the imaging section 130, and the indication light control unit 123 of the controller 120 to control the same. The sensor control unit 121 may perform the control based on the signal from the measurement processing unit 124.

The sensor data reception unit 122 receives a signal (image signal) from the imaging element 132, and transmits the image signal to the measurement processing unit 124.

The indication light control unit 123 receives a light signal from the sensor control unit 121, and turns ON or turns OFF the indication light (not shown).

The measurement processing unit 124 performs image processing based on the image signal from the sensor data reception unit 122. The measurement processing unit 124 sends the image-processed data to the input/output control unit 125. The measurement processing unit 124 receives commands from the display device 200 or the like through the input/output control unit 125. The measurement processing unit 124 transmits the commands from the input/output control unit 125 to the sensor control unit 121.

The input/output control unit 125 transmits and receives data to and from the display device 200 through the external device communication unit 126 and the LAN cable 301. On the contrary, the input/output control unit 125 receives commands from the display device 200. The input/output control unit 125 transmits and receives data to and from other external devices such as a printer or a wireless device through the other input/output unit 127.

Each unit in the configuration of the above controller 120 is enabled by a member arranged on a control substrate (not shown).

The controller 120 (or control substrate) includes a CPU (Central Processing Unit) 150 serving as an arithmetic processing unit, a non-volatile memory and a volatile memory serving as a storage unit (memory 149), various types of interfaces, and a data reader/writer. Such units are communicatably connected to each other through a bus. The CPU 150 deploys the programs (code) stored in the non-volatile memory to the volatile memory, and executes the programs in a predetermined order. The CPU 150 enables each unit described above by executing various calculations.

The volatile memory is typically a DRAM (Dynamic Random Access Memory, or the like). The volatile memory holds the image data acquired by the imaging section 130, the data indicating the processing result of the image data, the work data and the like in addition to the programs read out from the non-volatile memory.

The non-volatile memory may be a magnetic storage device. The non-volatile memory stores the image data (hereinafter also referred to as "model image") that becomes a reference in the pattern search in addition to the programs to be executed by the CPU 150. Various setting values and the like may be stored in the non-volatile memory.

Therefore, all or some of the sensor control unit 121, the sensor data reception unit 122, the indication light control unit 123, the measurement processing unit 124, the input/output control unit 125, the external device communication unit 126, and the input/output unit 127 of the controller 120 are function blocks that can be enabled when the CPU 150 executes the program. However, all or some of such function blocks may be enabled by hardware.

In other words, the controller 120 is a computer for providing various functions, as hereinafter described, by executing the programs installed in advance. The controller 120 may be installed with an OS (Operating System) for providing the basic functions of a computer in addition to applications for providing the functions according to the embodiment. In such a case, the program according to the embodiment may be to call out the necessary module of the program modules provided as one part of the OS with a predetermined array and at a predetermined timing, and to execute the process. In other words, the program itself according to the embodiment does not include the above module, and the process is executed in cooperation with the OS. The program according to the embodiment may not include some modules. Furthermore, the program according to the embodiment may be provided by being incorporated as one part of another application program. Some or all of the functions provided by the execution of the program may be enabled by a dedicated hardware circuit.

The imaging section 130 receives reflected light of the light emitted from the illuminating section 110, and outputs an image signal. The imaging section 130 includes the imaging element 132 partitioned into a plurality of pixels such as a CCD (Coupled Charged Device) or a CMOS (Complementary Metal Oxide Semiconductor) sensor in addition to the optical system of the imaging lens 131, or the like.

The configuration of the display device 200 will now be described. The display device 200 includes an LCD (Liquid Crystal Display) 201, an LCD control unit 202, a display image control unit 203, an image control unit 204, an image saving unit 205, a field bus control unit 206, communication units 207, 208, and 209, an operation unit 210, and a power supply unit 211. The communication units 207, 208, and 209 handle communication using Ethernet (registered trademark).

The LCD 201 displays the image from the image processing device 100 based on the signal from the LCD control unit 202. The LCD control unit 202 controls the display process of the LCD 201 based on a command from the display image control unit 203.

The operation unit 210 is enabled by a switch arranged on the outer side of the housing of the display device 200, and a tablet (not shown) that covers a surface of the LCD 201, or the like. The LCD 201 and the tablet constitute a touch panel. The user inputs commands to the display device 200 through the switch and the touch panel.

The display image control unit 203 sends a display command to the LCD control unit 202 based on the command from the operation unit 210 or based on the image from the image control unit 204. The display image control unit 203 exchanges data with the image control unit 204 through the communication units 208, 209 or directly. For instance, the display image control unit 203 causes the LCD 201 to display the image from the image control unit 204.

The image control unit 204 stores the image received from the image processing device 100 in the image saving unit 205. The image control unit 204 transmits the image stored in the image saving unit 205 to the display image control unit 203.

The field bus control unit 206 sends the image received from the image processing device 100 through the communication unit 207 to the image control unit 204. On the contrary, the field bus control unit 206 transmits the command on the image processing device 100 input through the operation unit 210 to the image processing device 100 through the communication unit 207.

<C. Hardware Configuration of Image Processing Device 100>

Figure 3:
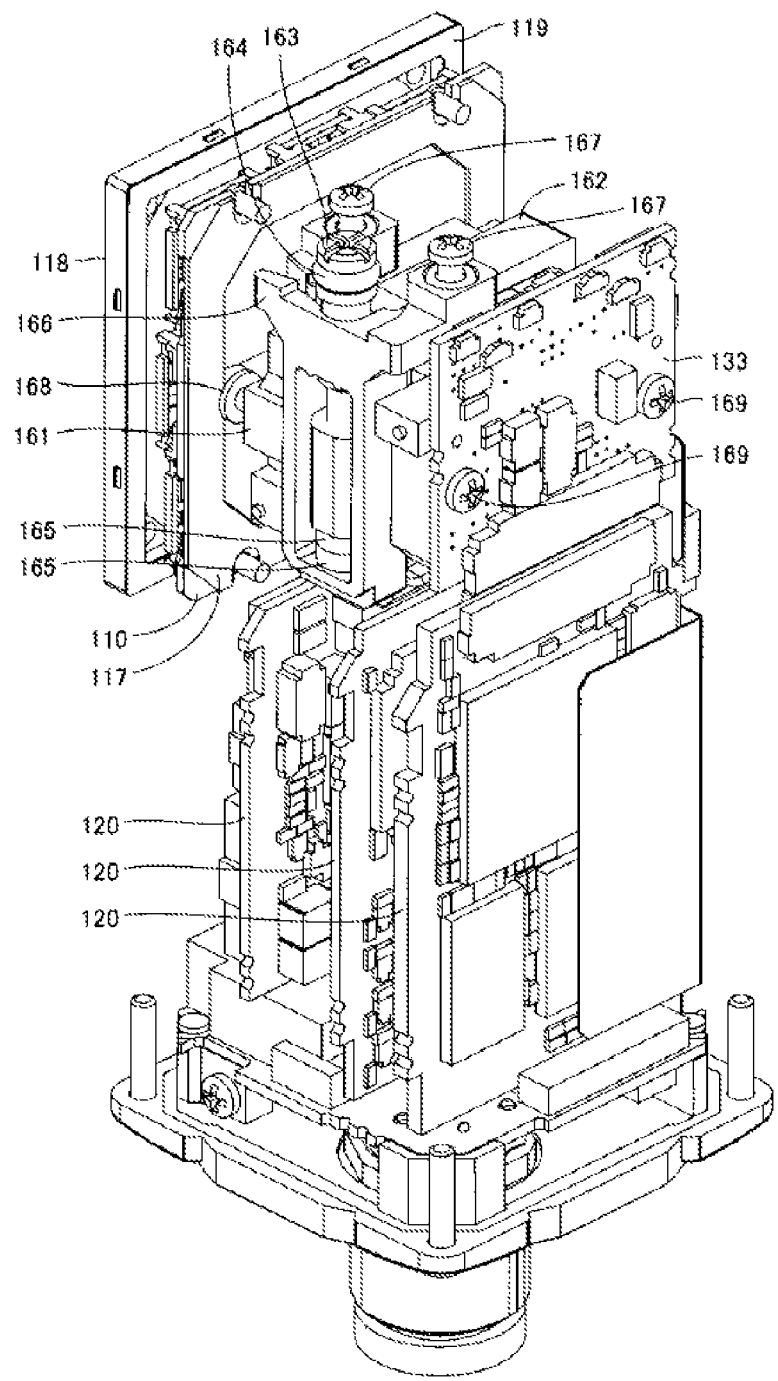
FIG. 3 is a perspective view of the interior of the image processing device.
Figure 4:
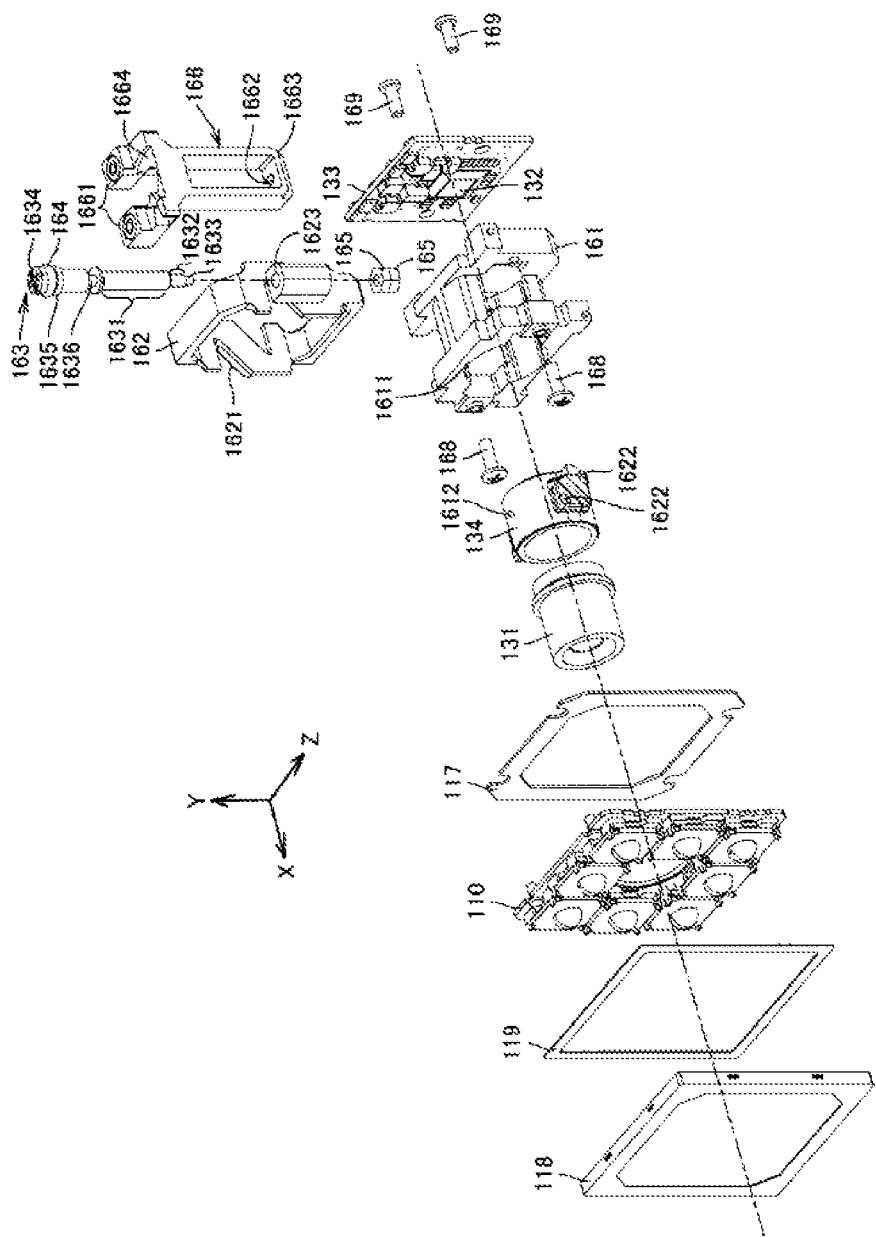
FIG. 4 is an exploded perspective view of the periphery of an imaging unit of the image processing device.
Figure 5:
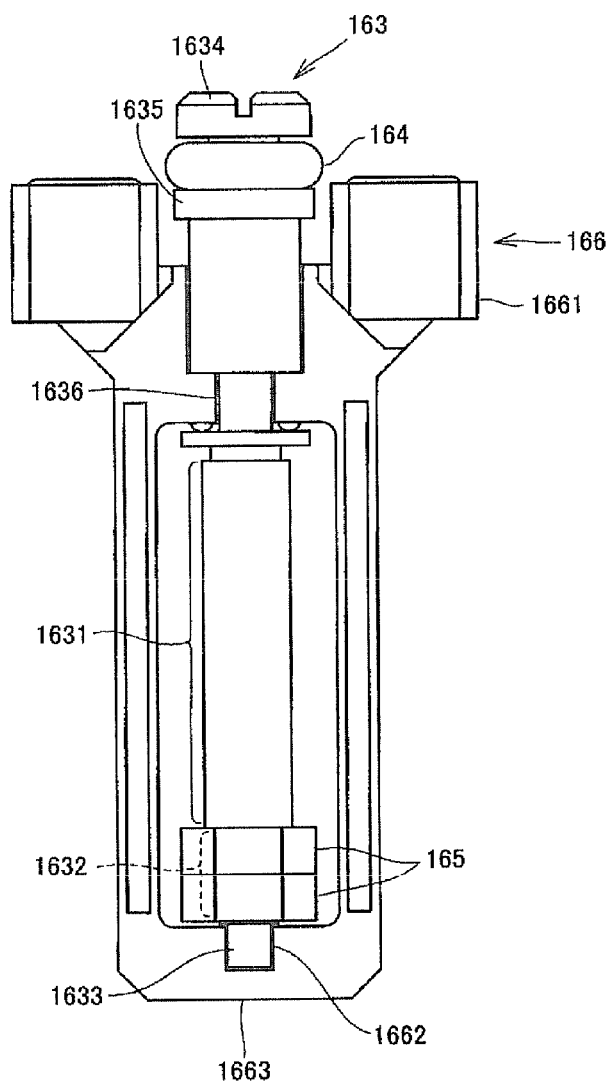
FIG. 5 is an assembly diagram of the periphery of an adjustment screw of the imaging unit.
Figure 6:
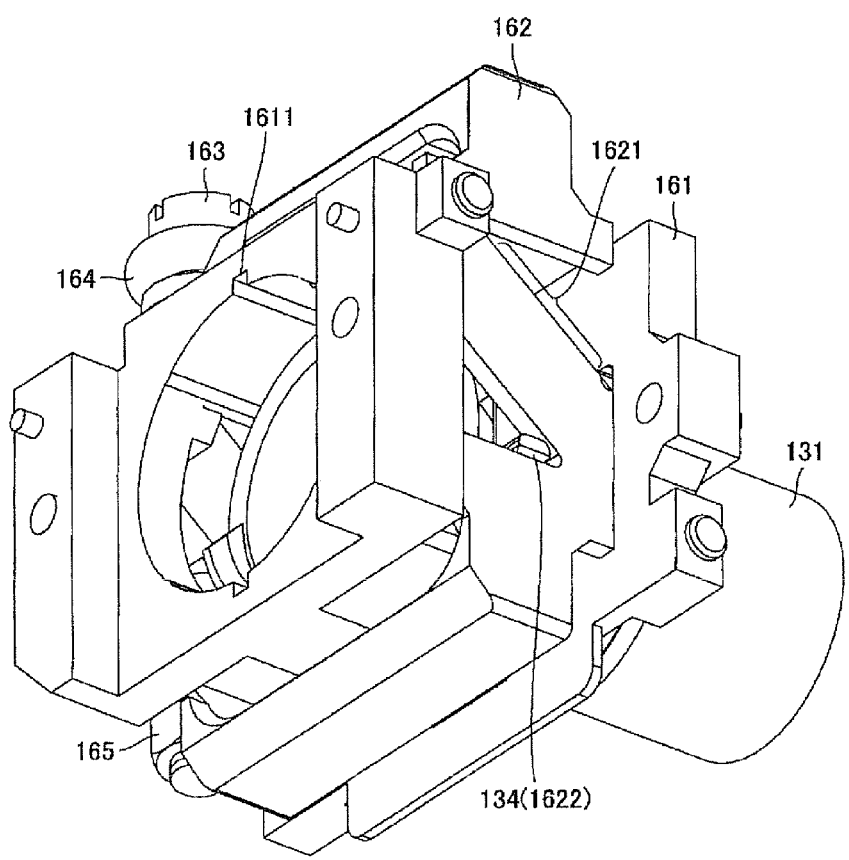
FIG. 6 is a perspective view of an adjustment mechanism of the imaging unit.

FIG. 3 is a perspective view of the interior of the image processing device 100. FIG. 4 is an exploded perspective view of the periphery of the imaging unit of the image processing device 100. FIG. 5 is an assembly diagram of the periphery of an adjustment screw 163 of the imaging unit. FIG. 6 is a perspective view of an adjustment mechanism of the imaging unit. With reference to FIGS. 3 to 6 and also with reference again to FIG. 1, the outer surface of the shape of the housing 101 is a substantially square prism having a height of about 80 mm with a cross section of a shape close to a square with one side slightly less than 40 mm.

A substantially square opening with a side having substantially the same length as the one side of the cross section of the square prism is formed on the upper surface side of one side surface of the housing 101. The side surface provided with the opening is hereinafter referred to as the front surface. The side surface of the housing 101 facing the front surface is the back surface.

Further, the lower surface of the housing 101 is formed such that a lid can be attached, to which a connector or the like for connecting the cable is attached. When seen from the interior of the housing 101, the front surface side is the front, the back surface side is the back, the upper surface side is the top, and the lower surface side is the bottom.

The longitudinal direction is the X-axis direction, where the front side is the positive direction and the back side is the negative direction. The vertical direction is the Y-axis direction, where the upper side is the positive direction and the lower side is the negative direction. The Z-axis direction defined by the X-axis direction and the Y-axis direction is also provided.

The image processing device 100 includes the illuminating section 110 and the imaging section 130 from the front surface side at the upper part of the interior of the housing 101 shown in FIG. 1, as well as the controller 120 at the lower part thereof.

The imaging section 130 includes, as a main configuration, a lens holder 134, a lens guide 161, a lens slider 162, an adjustment screw 163, an O-ring 164, a terminal nut 165, and an imaging element substrate 133, to which the imaging element 132 is mounted, in addition to the imaging lens 131 and the imaging element 132 described above.

A window member 118 is configured by a window frame and a transparent protective plate that transmits the light that enters the imaging section 130, and is attached to the window of the housing 101. The transparent protective plate is fitted to the inner side of the window frame. The transparent protective plate is made of an acrylic plate, but is not limited thereto, and may be other materials such as hardened glass as long as it is transparent and has the strength to withstand industrial applications.

The window member 118 is adhered and attached to the opening of the housing 101 with an adhesive sheet 119 so as to block the opening at the upper part of the front surface of the housing 101. The adhesive sheet 119 forms a waterproof structure for waterproofing and dustproofing between the opening of the housing 101 and the window member 118. However, there is no limitation to this, and the waterproofing structure may be another structure such as a structure in which the window member 118 and the housing 101 are tightened with a screw with a packing member such as rubber element sandwiched between the window member 118 and the housing 101.

The illuminating section 110 is attached to the housing 101 with a screw with a heat dissipating sheet 117 in between at the back side of the window member 118. With the heat dissipating sheet 117 in between, the heat generated by the LED of the illuminating section 110 is likely to be transmitted to the housing 101 side through a copper foil pattern of the illumination substrate and the heat dissipating sheet 117. The heat thus can be efficiently dissipated to the outside of the image processing device 100.

A plurality of LEDs is arranged in a matrix form at the front surface of the illumination substrate. Each of the LEDs is covered by an illumination lens. A set of eight LEDs and the illumination lens (illumination control unit 111 described above) is arranged on the illumination substrate at the periphery of the hole formed at substantially the center to pass the imaging lens 131. The illumination substrate is connected with the substrate of the controller 120 at the lower part with a connector cable.

The imaging lens 131 has a hollow cylindrical shape, and includes a lens having the center line of the hollow cylinder as an optical axis inside the hollow cylinder. The lens has a range (field, imaging range) of the imaging target entering the imaging element 132 that changes in accordance with the back focus (BF), which is the distance to the imaging element 132. The imaging lens 131 guides the light entering from outside through the window member 118 to the imaging element 132. The imaging lens 131 is provided with a male thread at the outer periphery of the cylinder on the side opposite to the side on which the light enters.

The optical axis of the imaging lens 131 passes substantially the center of the window member 118 and passes substantially the center of the imaging plane of the imaging element 132. That is, the optical axis is the X-axis direction. Further, the imaging lens 131 is arranged to pass through a hole formed at substantially the center of the illumination substrate of the illuminating section 110.

The lens guide 161 enables the lens holder 134 to move along the direction of the optical axis of the imaging lens 131, that is, the X-axis direction, and so that the lens slider 162 is movable along the vertical direction, that is, the Y-axis direction. The lens guide 161 is tightened to the bracket configured in the housing 101 with two screws 168. The lens guide 161 is thereby fixed to the housing 101.

The adjustment screw 163 is provided with a cross shaped hole for rotating the adjustment screw 163 by placing a plus-shaped (Phillips) driver at a head portion 1634, and has a male threaded portion 1631 formed at the shaft. A counter bore 1011 capable of receiving the head portion 1634 of the adjustment screw 163 and a hole for passing the shaft of the adjustment screw 163 are formed at the upper surface of the housing 101. The adjustment screw 163 is attached with the shaft passed through the hole and the head portion 1634 accommodated in the counter bore 1011, so that the direction of the shaft is in the negative direction of the Y-axis direction. Accordingly, the head portion 1634 of the adjustment screw 163 thus does not protrude from the upper surface but is exposed to enable the tool to be applied to turn the screw.

The hole or the groove for applying the tool of the adjustment screw 163 is not limited to a cross shaped hole for the plus-shaped driver, and may be another shape such as a slot for negative driver, a positive-negative hole that can be handled with both positive and negative drivers, or a hexagonal hole for a hexagon wrench.

An O-ring stopping rib 1635 is arranged below the head portion 1634 of the adjustment screw 163 to sandwich the O-ring 164 with the head portion 1634.

As the O-ring 164 is attached between the head portion 1634 of the adjustment screw 163 and the O-ring stopping rib 1635, water and dust are prevented from entering through a gap between the adjustment screw 163 at the through-hole of the adjustment screw 163 and the portion of the counter bore 1011 of the housing 101 from the outside. The adjustment screw 163 does not move in the Y-axis direction since the O-ring 164 is sandwiched between the head portion 1634 of the adjustment screw 163 and the O-ring stopping rib 1635, and hence the O-ring 164 does not move in the Y-axis direction with respect to the adjustment screw 163.

If the O-ring 164 moves in the Y-axis direction, the possibility of scraping off and involving water or dust attached to the wall surface of the counter bore 1011 or the shaft of the adjustment screw 163 and entering the inside becomes higher. In the embodiment, however, the O-ring 164 moves in the rotating direction with respect to the adjustment screw 163 and the housing 101 but is restrained in its movement in the Y-axis direction, and hence the water or dust attached to the wall surface or the shaft is prevented from being scraped off and involved, and entering the inside.

A holding portion 1636 held by the adjustment screw holder 166, to be described later, is arranged between the O-ring stopping rib 1635 and the male threaded portion 1631. The diameter of the holding portion 1636 is smaller than the diameters above and below it.

A terminal nut screw-in portion 1632 is arranged further to the distal end than the male threaded portion 1631 of the adjustment screw 163. The terminal nut screw-in portion 1632 has two terminal nuts 165 serving as hexagonal nuts attached as a double nut. Thus, the movement range of the lens slider 162 can be limited with a simple structure. The structure for limiting the movement range of the lens slider 162 is not limited to this, and a groove may be cut at the distal end of the adjustment screw 163, and an E-ring may be attached to the groove.

The nominal diameter (e.g., M2) of the screw of the terminal nut screw-in portion 1632 is smaller than the nominal diameter (e.g., M3) of the screw of the male threaded portion 1631. Thus, the gap between the other portion of the image processing device 100 such as the lens slider 162 or the housing 101 and the terminal nut 165 becomes larger than when the nominal diameter is not made small, and hence the ability to turn the terminal nut 165 is enhanced.

An adjustment screw holder inserting portion 1633 is arranged further to the distal end than the terminal nut screw-in portion 1632 of the adjustment screw 163. The diameter of the adjustment screw holder inserting portion 1633 is narrower than the diameter of the terminal nut screw-in portion 1632.

The adjustment screw holder 166 includes a housing attachment portion 1661, an adjustment screw holding portion 1664, and an electrostatic barrier portion 1663.

The housing attachment portion 1611 is a portion where two screws 167 for fixing the adjustment screw holder 166 to the housing 100 are screwed in.

The adjustment screw holding portion 1664 has a U-shaped cutout. The radius of the arcuate portion of the bottom of the U-shape of the cutout is defined such that the arcuate portion becomes a clearance fit with the holding portion 1636 of the adjustment screw holder 166. The thickness of the U-shape is defined to be slightly thinner than the length of the holding portion 1636 of the adjustment screw 163 (e.g., such that the thickness of the U-shape and the length of the holding portion 1636 are tolerance of clearance fit). The adjustment screw holding portion 1664 thus holds the holding portion 1636 of the adjustment screw 163 by restraining the adjustment screw 163 so as to be rotatable in the rotating direction of the male threaded portion 1631 but immovable in the axial direction.

The electrostatic barrier portion 1663 is arranged to cover the longitudinal direction (positive direction and negative direction of X-axis) of the shaft of the adjustment screw 163 and its lower end. The adjustment screw holder 166 is conductive. The shaft of the adjustment screw 163 is thus shielded with respect to the other portions with the electrostatic barrier portion 1663, the lens slider 162, and the housing 101.

Thus, when static electricity flows from the outside of the housing 101 to the head portion 1634 of the adjustment screw 163, electrostatic discharge from the shaft of the adjustment screw 163 with respect to the illumination substrate, the imaging element substrate 133 and other substrates as well as the chassis arranged to cover the periphery of the substrate of the controller 120 is prevented. As a result, problems are prevented from occurring in the image processing device 100 due to the influence of static electricity through the adjustment screw 163, which is a conductive body, exposed to the outside of the image processing device 100.

An adjustment screw tip inserting groove 1662 serving as a groove to which the adjustment screw holder inserting portion 1633 of the adjustment screw 1633 is inserted is formed on the inner side of the lower end face of the electrostatic barrier portion 1663.

The lens slider 162 has a frame structure surrounding the lens guide 161 and the lens holder 134. The frame structure is configured by left and right vertical frames of symmetric shape and upper and lower horizontal frames for connecting the two vertical frames. The lens slider 162 includes a female threaded portion 1623 to which the male threaded portion 1631 of the adjustment screw 163 is screwed on the outer side of the vertical frame on the positive side of the Z-axis.

The lens slider 162 is guided by the lens guide 161 so as to be movable along the Y-axis direction, and the adjustment screw 163 is restrained in the Y-axis direction. Thus, when the adjustment screw 163 is rotated in the clockwise direction, that is, the tightening direction, the lens slider 162 is moved in the direction approaching the head portion 1634 of the adjustment screw 163, that is, the positive direction of the Y-axis with respect to the housing 101. When the adjustment screw 163 is rotated in the counterclockwise direction, that is, in the loosening direction, the lens slider 162 is moved in the direction separating it from the head portion 1634 of the adjustment screw 163, that is, the negative direction in the Y-axis with respect to the housing 101.

The vertical frame sides of the lens slider 162 have a shape similar to the letter "Z", and includes a band-shaped inclined portion 1621 similar to the diagonal portion of the letter "Z". The band-shaped inclined portion 1621 extends in the direction different (hereinafter referred to as "slide direction") from the X-axis direction and the Y-axis direction contained in the plane including the X-axis direction and the Y-axis direction. The plane including the slide direction, the X-axis, and the Y-axis is referred to as the slide plane.

The main portion of the lens holder 134 has a hollow cylindrical shape, where the female threaded portion, to which the male threaded portion formed in the imaging lens 131 is screwed, is formed over the entire length in the length direction of the hollow cylinder at the interior of the hollow cylinder. The female threaded portion is formed over the entire length herein, but there is no limitation to this, and the female threaded portion may be formed only at the portion to be screw-fitted to the male threaded portion.

The lens holder 134 and the lens guide 161 respectively have a slidable surface, and slidably move along this surface. The lens holder 134 includes a projection 1612 for preventing rotation about the X-axis and for enabling a slidable movement only in the X-axis direction, near the point where the line parallel to the Y-axis passing the vicinity of the center of gravity of the hollow cylinder intersects with the outer peripheral surface. The lens guide 161 includes an engagement groove 1611 for engaging with the projection of the lens holder 134.

However, there is no limitation to such a structure, and other structures may be adopted as long as the lens holder 134 is guided along the X-axis direction in the lens guide 161 so as not to rotate about the X-axis. For instance, the outer surface of the lens holder 134 may not be cylindrical and may have another shape such as a column shape having a square rounded corner cross section. The rotation about the axis is prevented when slidably moving along the axis direction with the columnar shape having a cross section other than a circle.

Engagement projections 1622 to be engaged with the band-shaped inclined portion 1621 of the lens slider 162 serving as the engagement section are arranged at the portion that does not slidably move with the lens guide 161 at the outer peripheral surface of the lens holder 134 or the portion near the point where the line parallel to the Z-axis passing the vicinity of the center of gravity of the hollow cylinder intersects with the outer peripheral surface.

The engagement projections 1622 include a pair of projections for sandwiching the band-shaped inclined portion 1621. That is, the interval of the two projections is equal to the width of the band-shaped inclined portion 1621. The fitting of the band-shaped inclined portion 1621 and the engagement projections 1622 is a close fit. The material of the engagement projections 1622 is resin. As close fitting is to be carried out, the band-shaped inclined portion 1621 and the engagement projections 1622 are fitted without play, but problems do not arise in the slide of the engagement projections 1622 with respect to the band-shaped inclined portion 1621 since the material of the engagement projections 1622 is resin and elasticity is appropriately provided.

When the lens slider 162 is moved in the Y-axis direction due to the operation of the conversion mechanism configured by the lens guide 161, the band-shaped inclined portion 1621, and the engagement projections 1622, the engagement projections 1622 receive a force in the direction perpendicular to the slide direction, and the lens holder 134 and the imaging lens 131 are moved in the X-axis direction since the lens holder 134 is movable in the X-axis direction but is restrained from moving in the Y-axis direction.

An adjustment mechanism for adjusting the back focus of the lens by moving the lens along the direction of the optical axis is configured with the lens guide 161, the lens slider 162, the adjustment screw 163, the lens holder 134, and the imaging lens 131 as the main configuration.

The light from the imaging target enters the imaging plane configured by the CCD or the CMOS of the imaging element 132 through the window member 118 and the imaging lens 131 along the optical axis. That is, the image of the target is imaged on the imaging plane. The imaging element 132 converts the light entering to the imaging plane to an electric signal, and outputs the same to the imaging element substrate 133.

The imaging element substrate 133 processes the electric signal input from the imaging element 132, and outputs it to other substrates of the controller 120. The imaging element substrate 133 is tightened to the lens guide 161 with two screws 169. The lens guide 161 is fixed with respect to the housing 101, and thus the imaging element substrate 133 is indirectly fixed to the housing 101. The imaging element substrate 133 is connected to the substrate of the controller 120 at the lower part with a connector cable.

Figure 7B:
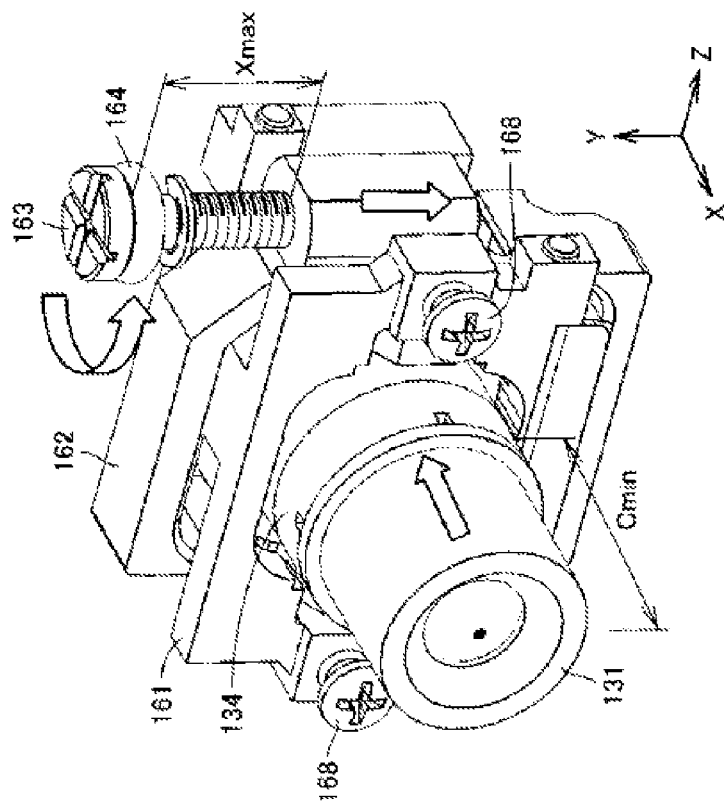
FIGS. 7A and 7B are perspective views describing the movement of the imaging unit.
Figure 7A:
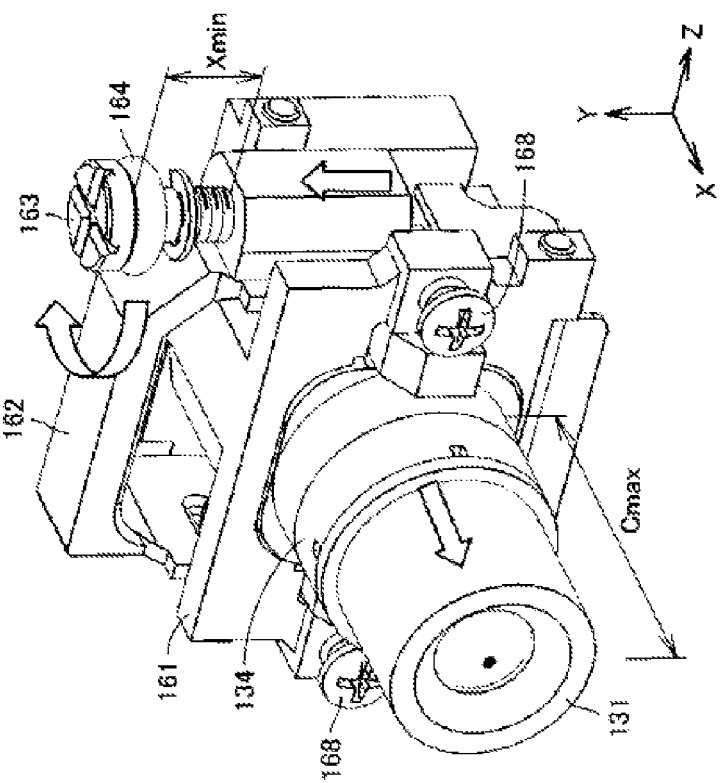
Figure 8A:
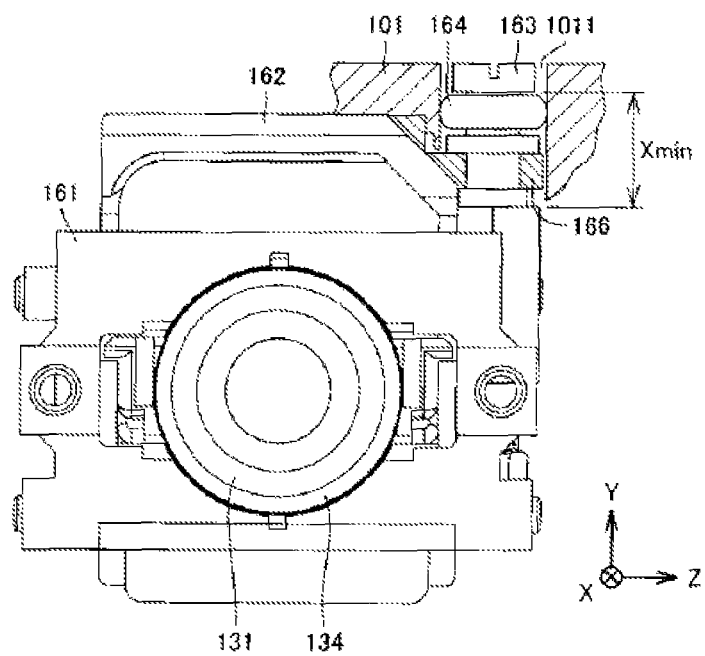
FIGS. 8A and 8B are front views describing the movement of the imaging unit.
Figure 8B:
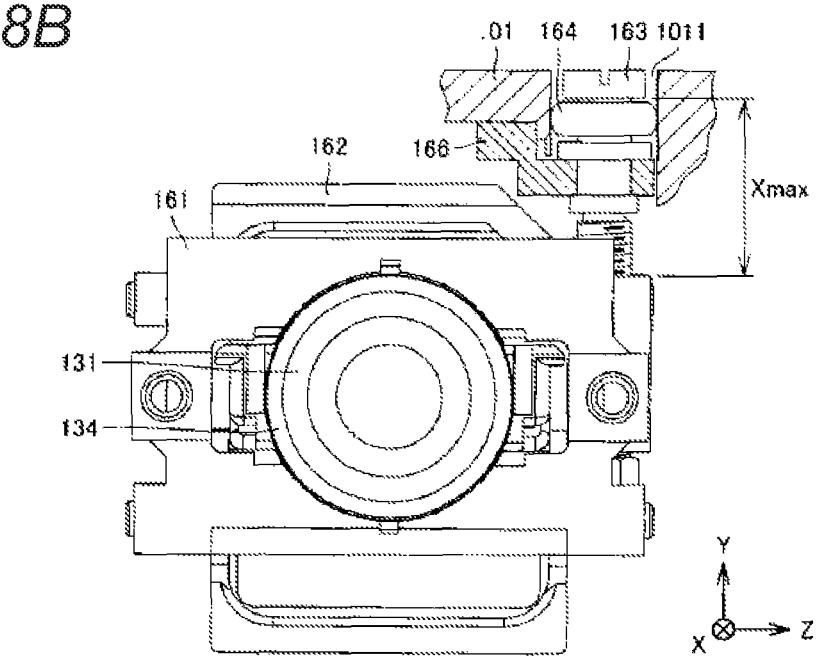
Figure 9A:
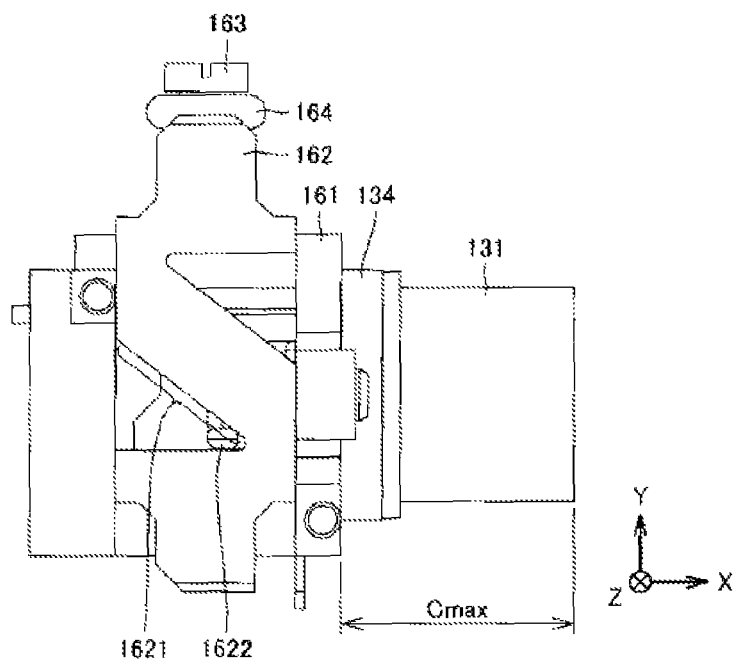
FIGS. 9A and 9B are side views describing the movement of the imaging unit.
Figure 9B:
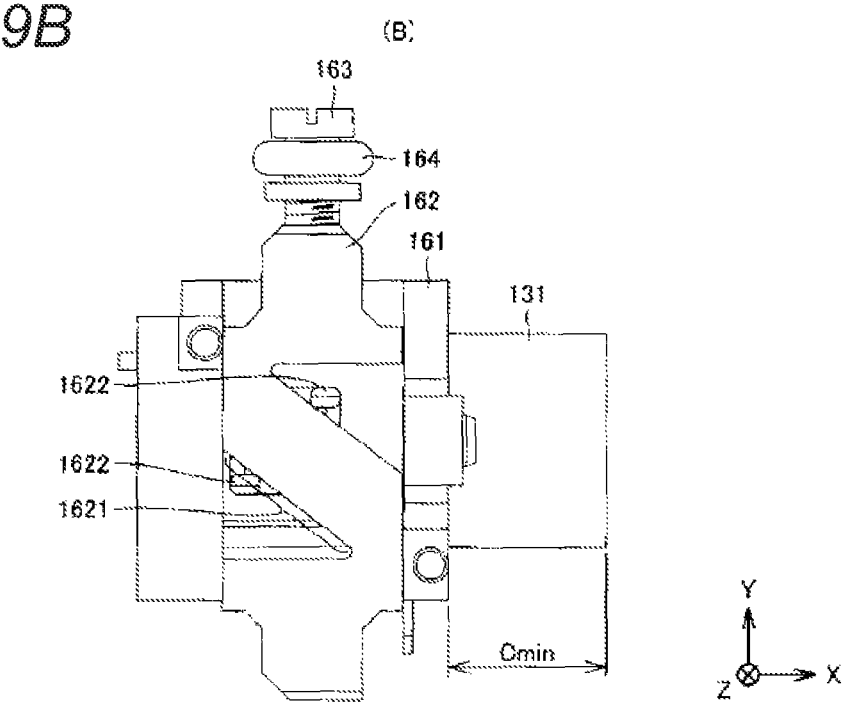
Figure 13:
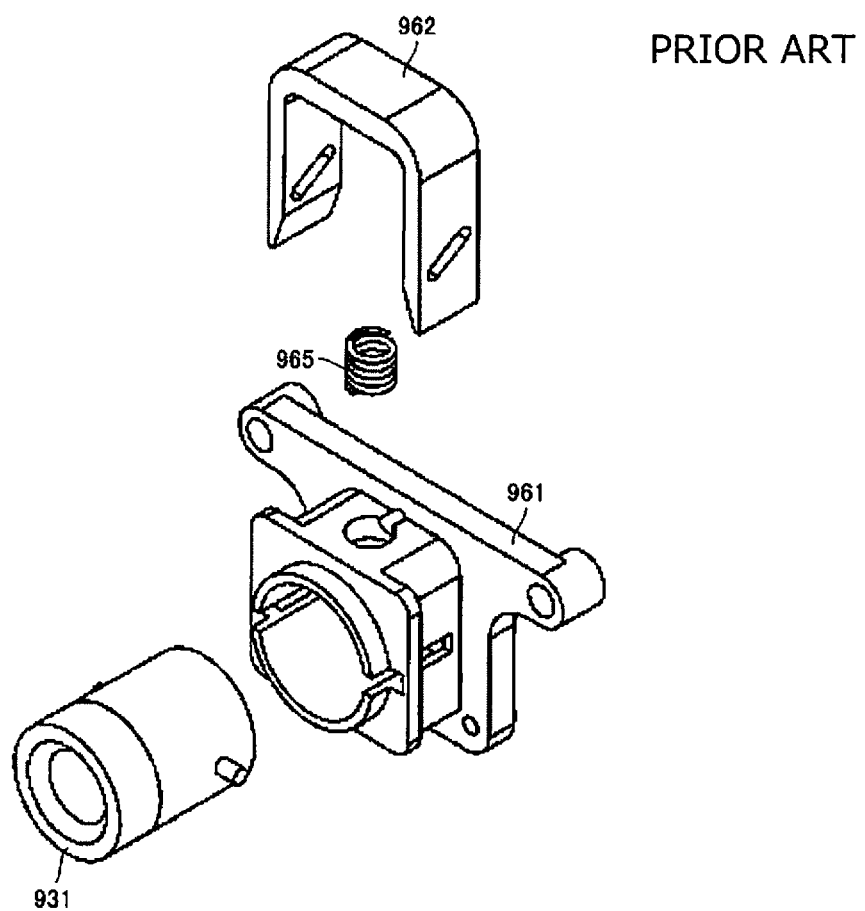
FIG. 13 is a second view illustrating a specific example of an adjustment method of the back focus in the visual sensor.
Figure 14A:
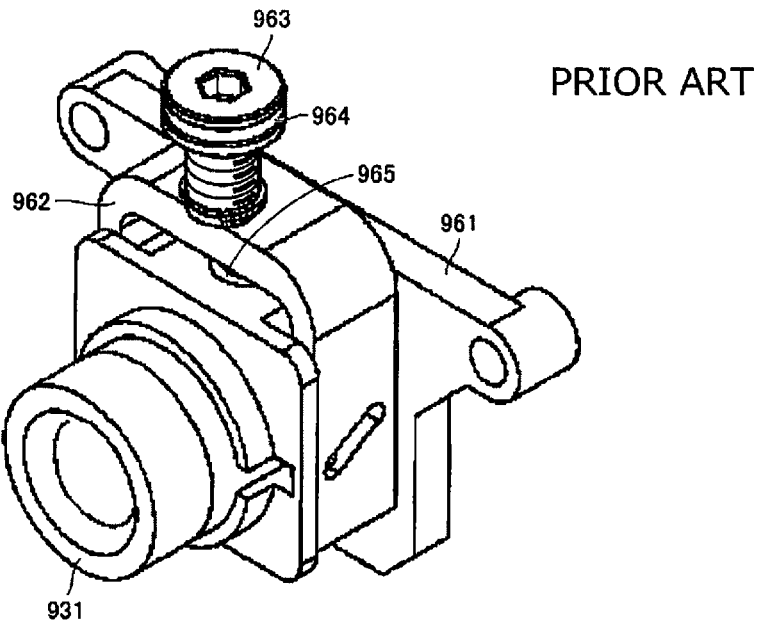
FIGS. 14A and 14B are a third view illustrating a specific example of an adjustment method of the back focus in the visual sensor.
Figure 14B:
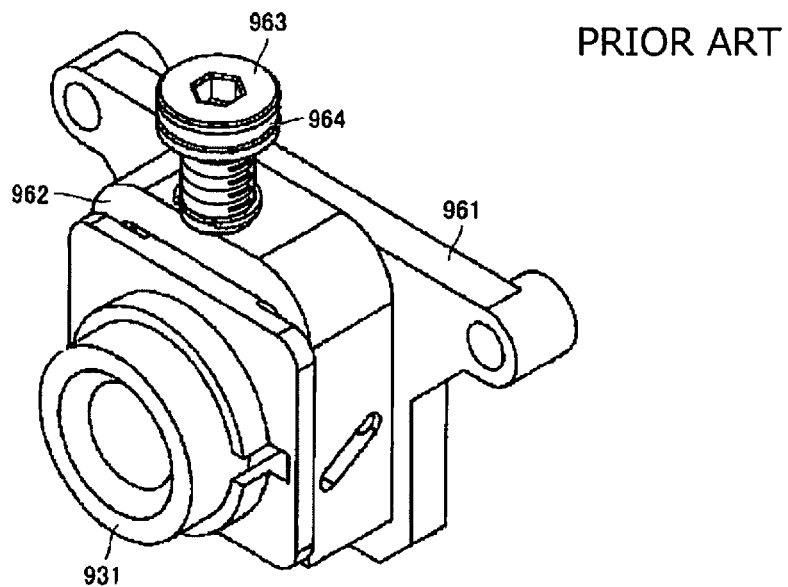
Figure 15A:
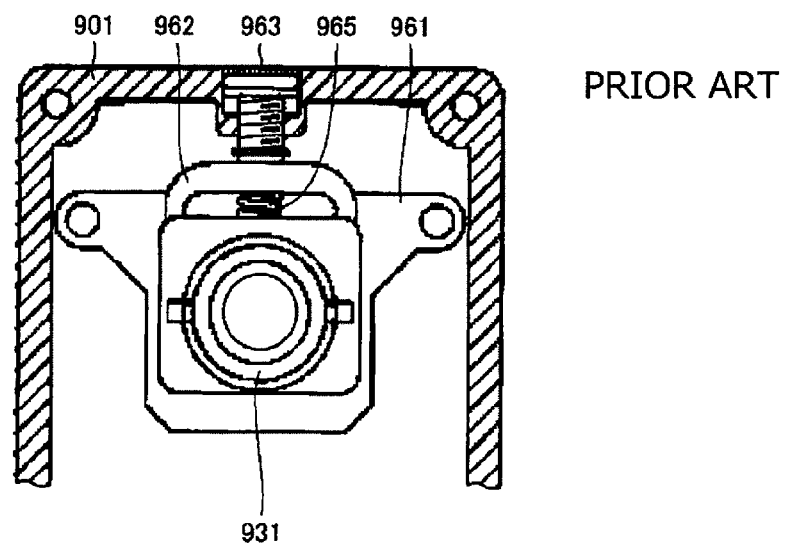
FIGS. 15A and 15B are a fourth view illustrating a specific example of an adjustment method of the back focus in the visual sensor.
Figure 15B:
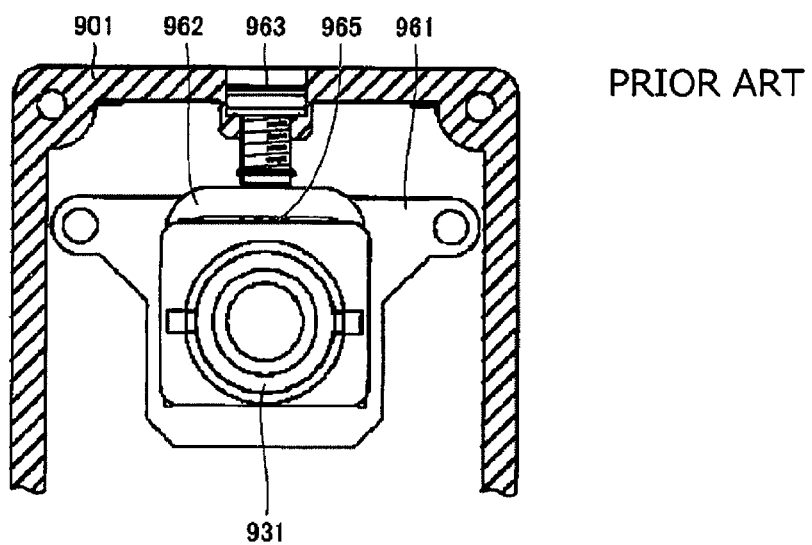
Figure 16A:
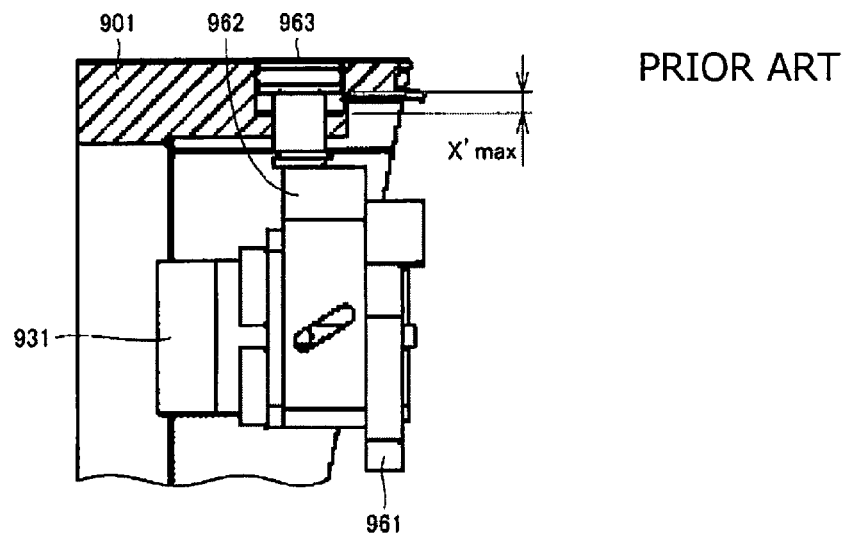
FIGS. 16A and 16B are a fifth view illustrating a specific example of an adjustment method of the back focus in the visual sensor.
Figure 16B:
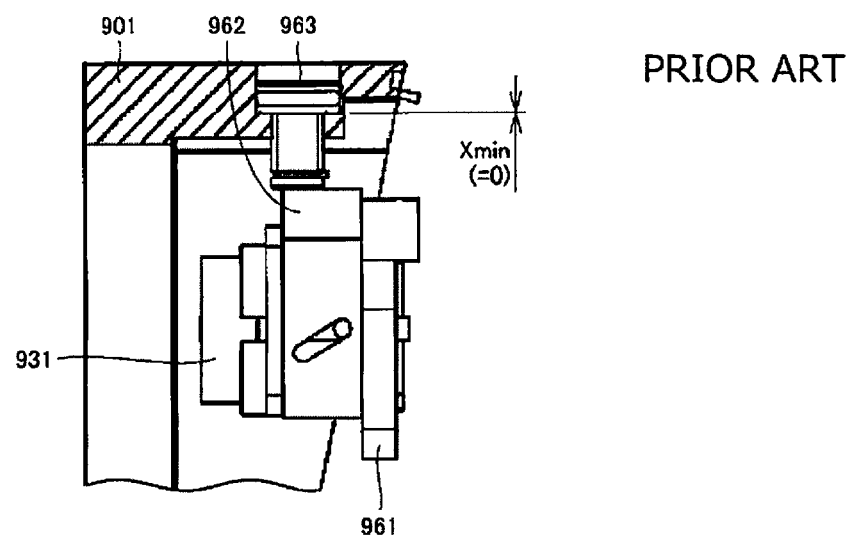

FIGS. 7A and 7B are perspective views describing the movement of the imaging unit. FIGS. 8A and 8B are front views describing the movement of the imaging unit. FIGS. 9A and 9B are side views describing the movement of the imaging unit. With reference to FIGS. 7A and 7B to FIGS. 9A and 9B, FIG. 7A, FIG. 8A, and FIG. 9A show a state in which the lens is projecting out the most, and FIG. 7B, FIG. 8B, and FIG. 9B show a state in which the lens is withdrawn the most.

When the adjustment screw 163 is rotated in the direction of being tightened the most, that is, the clockwise direction and the upper surface of the female threaded portion 1623 of the lens slider 162 reaches the upper end of the stroke range of the adjustment screw 163, the distance between the upper surface of the female threaded portion 1623 of the lens slider 162 and the bearing surface of the adjustment screw 163 is Xmin.

As the adjustment screw 163 is rotated towards the right, the lens slider 162 is guided by the lens guide 161 and is moved in the positive direction of the Y-axis with respect to the housing 101. The lens holder 134 is thereby guided by the lens guide 161, and moved in the positive direction of the X-axis. The distance between the front surface of the lens guide 161 and the front surface of the imaging lens 131 in a state where the adjustment screw 163 is rotated the most to the right is Cmax.

When the adjustment screw 163 is rotated in the direction of being loosened the most, that is, the counterclockwise direction and the lower surface of the female threaded portion 1623 of the lens slider 162 reaches the double nut configured by the two terminal nuts 165, the distance between the upper surface of the female threaded portion 1623 of the lens slider 162 and the bearing surface of the adjustment screw 163 is Xmax.

As the adjustment screw 163 is rotated towards the left, the lens slider 162 is guided by the lens guide 161 and is moved in the negative direction of the Y-axis with respect to the housing 101. The lens holder 134 is thereby guided by the lens guide 161, and moved in the negative direction of the X-axis. The distance between the front surface of the lens guide 161 and the front surface of the imaging lens 131 in a state where the adjustment screw 163 is rotated the most to the left is Cmin.

Thus, the stroke (=Cmax−Cmin) of the imaging lens 131 becomes greater the greater the stroke (=Xmax−Xmin) of the lens slider 162.

In this way, the embodiments provide an imaging device with measurement processing capable of expanding the variation of the imaging target distance and the imaging range without creating problems in the attribute measurement process.

The embodiments disclosed herein are illustrative in all aspects and should not be construed as being restrictive. The scope of the invention is defined by the claims and not by the description made above, and meaning equivalent to the claims and all modifications within the scope of the claims are intended to be encompassed herein.

What is claimed is:

1. An imaging device for measurement processing, the imaging device comprising:
   a housing;
   an imaging element configured to form an image, the imaging element being fixed to the housing;
   a lens positioned to guide incident light to the imaging element; and
   an adjustment mechanism configured to adjust a distance between the lens and the imaging element by moving the lens along an optical axis of the lens, the optical axis extending in a first direction, the adjustment mechanism comprising:
   a first threaded member having a longitudinal axis extending in a second direction that is different from the first direction, the first threaded member being rotatable around the longitudinal axis without moving in the second direction;
   a lens slider including a second threaded member engaging the first threaded member; and
   a conversion mechanism configured to convert a rotation of the first threaded member around the longitudinal axis into a movement of the lens along the optical axis of the lens,
   wherein the conversion mechanism movably guides the lens slider along the second direction and moves the lens along the first direction to change an imaging element distance according to a change in position of the lens slider along the second direction due to the rotation of the first threaded member,
   wherein the adjustment mechanism includes an adjustment unit including the first threaded member, the adjustment unit being attached to the housing so as to be rotatable in a rotating direction of the first threaded member with respect to the housing and so that movement of the first threaded member in the second direction is restrained with respect to the housing,
   wherein the adjustment mechanism includes a lens holder for supporting the lens,
   wherein the lens slider has a frame structure which surrounds the lens holder,
   wherein the conversion mechanism is arranged between the lens holder and the lens slider, and
   wherein the second threaded member engaging the first threaded member is arranged on an outer side of part of the frame structure extending in the second direction.

2. The imaging device for measurement processing according to claim 1,
   wherein the longitudinal axis of the first threaded member does not intersect with the optical axis of the lens.

3. The imaging device for measurement processing according to claim 1, wherein the imaging device is adapted to output a signal that represents the image to perform an attribute measurement process defined in advance with respect to the formed image.

4. The imaging device for measurement processing according to claim 1, wherein
   the conversion mechanism further includes an engagement section, which extends in a third direction that is different from the first direction and the second direction and that lies in a slide plane including the first direction and the second direction, arranged on one of the lens holder and the lens frame slider; and
   an engagement projection which engages the engagement section is arranged on the other one of the lens holder and the lens frame slider.

5. The imaging device for measurement processing according to claim 4, wherein
the engagement section is arranged on the lens frame slider and the engagement projection is arranged on the lens holder; and
the engagement section includes a band-shaped inclined portion extending in the third direction, and the engagement projection includes a pair of projections sandwiching the band-shaped inclined portion.

6. The imaging device for measurement processing according to claim 1, further comprising a control unit configured to limit a range of movement between the adjustment unit and the lens slider.

7. The imaging device for measurement processing according to claim 1, wherein an angle formed by the first direction and the second direction is substantially a right angle.

8. The imaging device for measurement processing according to claim 1, wherein
the imaging element, the lens, and the adjustment mechanism are accommodated inside the housing;
the adjustment unit includes a head to which a tool can be applied to turn the first threaded member about the longitudinal axis; and
the head includes a tool engagement portion exposed from the housing to be engaged by the tool, a seal being arranged between the head and the housing.

9. An imaging device for measurement processing, the imaging device comprising:
a housing;
an imaging element configured to form an image, the imaging element being fixed to the housing;
a lens positioned to guide incident light to the imaging element; and
an adjustment mechanism configured to adjust a distance between the lens and the imaging element by moving the lens along an optical axis of the lens, the optical axis extending in a first direction, the adjustment mechanism comprising:
a first threaded member having a longitudinal axis extending in a second direction that is different from the first direction, the first threaded member being rotatable around the longitudinal axis without moving in the second direction;
a lens slider including a second threaded member engaging the first threaded member; and
a conversion mechanism configured to convert a rotation of the first threaded member around the longitudinal axis into a movement of the lens along the optical axis of the lens,
wherein the conversion mechanism movably guides the lens slider along the second direction and moves the lens along the first direction to change an imaging element distance according to a change in position of the lens slider along the second direction due to the rotation of the first threaded member,
wherein the longitudinal axis of the first threaded member does not intersect with the optical axis of the lens.

10. The imaging device for measurement processing according to claim 9,
wherein the adjustment mechanism includes an adjustment unit including the first threaded member, the adjustment unit being attached to the housing so as to be rotatable in a rotating direction of the first threaded member with respect to the housing and so that movement of the first threaded member in the second direction is restrained with respect to the housing.

11. The imaging device for measurement processing according to claim 10, wherein
the imaging element, the lens, and the adjustment mechanism are accommodated inside the housing;
the adjustment unit includes a head to which a tool can be applied to turn the first threaded member about the longitudinal axis; and
the head includes a tool engagement portion exposed from the housing to be engaged by the tool, a seal being arranged between the head and the housing.

12. An imaging device for measurement processing, the imaging device comprising:
a housing;
an imaging element configured to form an image, the imaging element being fixed to the housing;
a lens positioned to guide incident light to the imaging element; and
an adjustment mechanism configured to adjust a distance between the lens and the imaging element by moving the lens along an optical axis of the lens, the optical axis extending in a first direction, the adjustment mechanism comprising:
a first threaded member having a longitudinal axis extending in a second direction that is different from the first direction, the first threaded member being rotatable around the longitudinal axis without moving in the second direction;
a lens slider including a second threaded member engaging the first threaded member; and
a conversion mechanism configured to convert a rotation of the first threaded member around the longitudinal axis into a movement of the lens along the optical axis of the lens,
wherein the conversion mechanism movably guides the lens slider along the second direction and moves the lens along the first direction to change an imaging element distance according to a change in position of the lens slider along the second direction due to the rotation of the first threaded member,
wherein the adjustment mechanism includes a lens holder for supporting the lens, and the lens slider having a frame structure which surrounds the lens holder, wherein the conversion mechanism is arranged between the lens holder and the lens slider,
wherein the conversion mechanism further includes an engagement section, which extends in a third direction that is different from the first direction and the second direction and that lies in a slide plane including the first direction and the second direction, arranged on one of the lens holder and the lens slider; and
wherein an engagement projection which engages the engagement section is arranged on the other one of the lens holder and the lens slider.

13. The imaging device for measurement processing according to claim 12, wherein
the engagement section is arranged on the lens slider and the engagement projection is arranged on the lens holder; and
the engagement section includes a band-shaped inclined portion extending in the third direction, and the engagement projection includes a pair of projections sandwiching the band-shaped inclined portion.

* * * * *